United States Patent
Lin et al.

(10) Patent No.: US 8,355,010 B2
(45) Date of Patent: Jan. 15, 2013

(54) LOAD CELL TOUCH CONTROL DEVICE

(75) Inventors: Chung-Liang Lin, Chiayi (TW);
Chang-Chun Lung, Jhubei (TW);
Pi-Lieh Chang, Kaohsiung (TW);
Tsung-Hsin Liu, Xinshi Township,
Tainan County (TW); Ta-Jen Lin, Jhubei
(TW); Ko-Po Lin, Taixi Township,
Yunlin County (TW); Cheng-Hao Yu,
Hukou Township, Hsinchu County (TW)

(73) Assignee: Geee Creations, Inc., Zhubei, Hsinchu County (TW)

( * ) Notice: Subject to any disclaimer, the term of this patent is extended or adjusted under 35 U.S.C. 154(b) by 549 days.

(21) Appl. No.: 12/654,220

(22) Filed: Dec. 15, 2009

(65) Prior Publication Data
US 2011/0050622 A1 Mar. 3, 2011

(30) Foreign Application Priority Data

Aug. 28, 2009 (TW) ................................ 98128988 A

(51) Int. Cl.
*G06F 3/045* (2006.01)

(52) U.S. Cl. ............................ 345/174; 345/173; 482/55
(58) Field of Classification Search .......... 345/173–179; 482/54
See application file for complete search history.

(56) References Cited

U.S. PATENT DOCUMENTS

| 5,016,480 A | * | 5/1991 | Holroyd | 73/862.59 |
| 2007/0004563 A1 | * | 1/2007 | Reyes et al. | 482/54 |

* cited by examiner

*Primary Examiner* — Kimnhung Nguyen
(74) *Attorney, Agent, or Firm* — Bacon & Thomas, PLLC

(57) ABSTRACT

A load cell touch control device includes a touch panel, a plurality of load cells and a control unit. The touch panel receives a stress applied thereon. The load cells are implemented in the touch panel to detect respective components of the stress received by the touch panel. The control unit is connected to the load cells in order to receive magnitudes of the respective components to thereby calculate a magnitude, position and motion trace of the stress on the touch panel based on the respective components detected by the load cells in the touch panel.

14 Claims, 9 Drawing Sheets

LOAD CELL TOUCH CONTROL DEVICE

BACKGROUND OF THE INVENTION

1. Field of the Invention

The present invention relates to a touch control device and, more particularly, to a load cell touch control device for detecting a motion trace.

2. Description of Related Art

Three detection manners are used in existing touch control devices. A first manner uses a resistive film to detect the positions of the contacts through the resistances, an analog-to-digital converter (ADC) to convert the positions of the contacts into digital signals, and a microcontroller to receive the digital signals to accordingly determine the positions on a panel touched by a user. A second manner uses a capacitive sensor to detect the positions of the contacts through the coupling capacitances at the touched points, and a microcontroller to determine the positions on a panel touched by a user. A third manner uses an optical grid to determine the positions on a panel touched by a user by shading the touched points from the light.

However, the cited manners have some operating defects respectively. For example, the response speed in the first manner becomes slower when the size of a panel is increased, and the manufacture cost is relatively increased. The unit resolution is affected by the shape and size of the capacitor used in the second manner, and this is not preferred in cost. The third manner is limited to the optical device itself, for the unit resolution of the optical grid cannot be increased as desired. In addition, the cited manners cannot detect the size of the applied force on touch, and can detect only the touched position. Besides, for the existing touch control devices, the manufacture cost is proportional to the panel area, i.e., the cost is increased as the panel area is enlarged.

Therefore, it is desirable to provide an improved touch control device to mitigate and/or obviate the aforementioned problems.

SUMMARY OF THE INVENTION

The object of the present invention is to provide a load cell touch control device, which can detect an applied strength magnitude in addition to the position of a touched point and also overcome the problem that the cost of a touch control device is increased as the panel area is enlarged.

To achieve the object, this invention provides a load cell touch control device. The load cell touch control device includes a touch panel, a plurality of load cells and a control unit. The touch panel receives a stress applied to a special position thereon. The load cells are implemented at predetermined positions in the touch panel to detect respective components of the stress applied to the touch panel. The control unit is connected to the load cells in order to receive magnitudes of the respective components detected by the load cells to thereby calculate the special position and a magnitude of the stress on the touch panel based on the respective components and the predetermined positions of the load cells in the touch panel. The control unit receives the respective components detected by the load cells at a plurality of continuous time points in order to thereby calculate the special position on the touch panel applied at each time point to thereby obtain a motion trace applied to the touch panel.

The invention provides the load cell touch control device which includes a plurality of load cells (full- or half-bridge) and a touch panel to form a touch mechanism and obtains the functions, such as touched position detection, trace sketch and touch force numeral detection, for a typical touch control device through an operating procedure without adding the cost required for the increased panel area.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
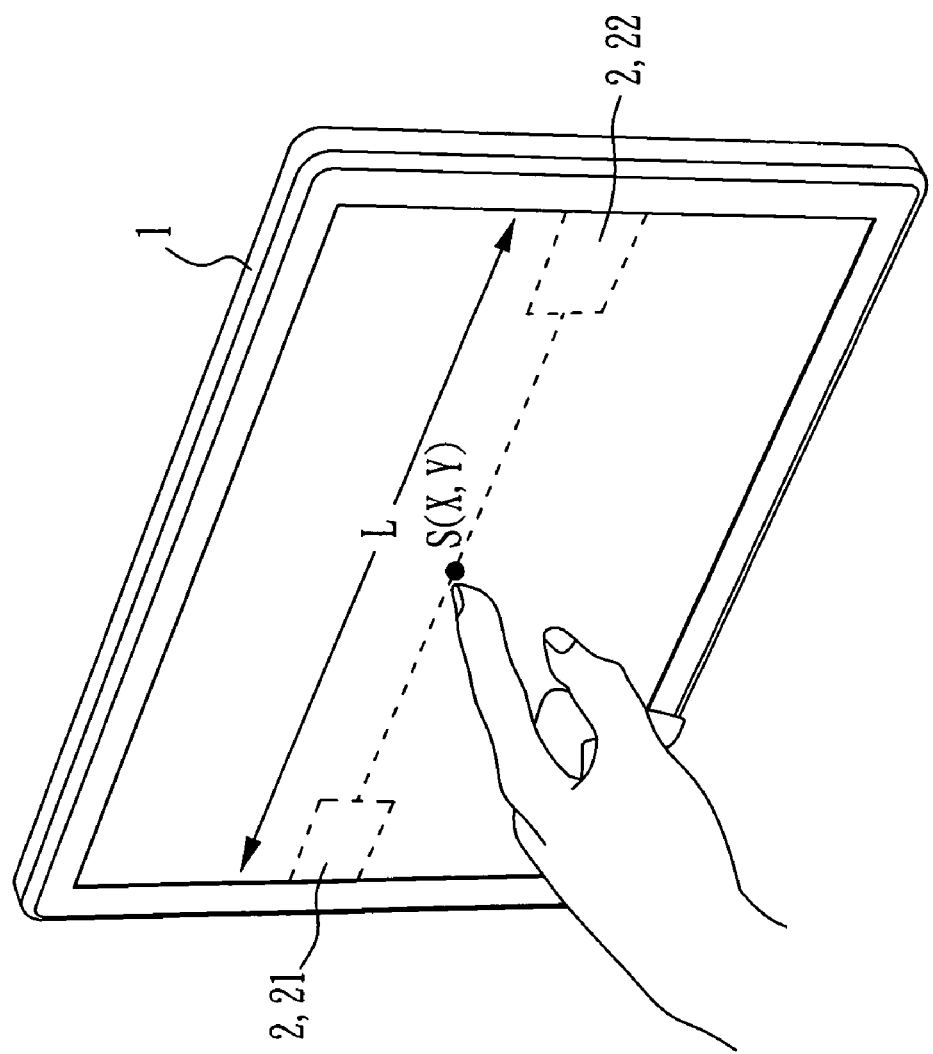
FIG. 1 is a schematically solid view of a load cell touch control device according to an embodiment of the invention.
Figure 2:
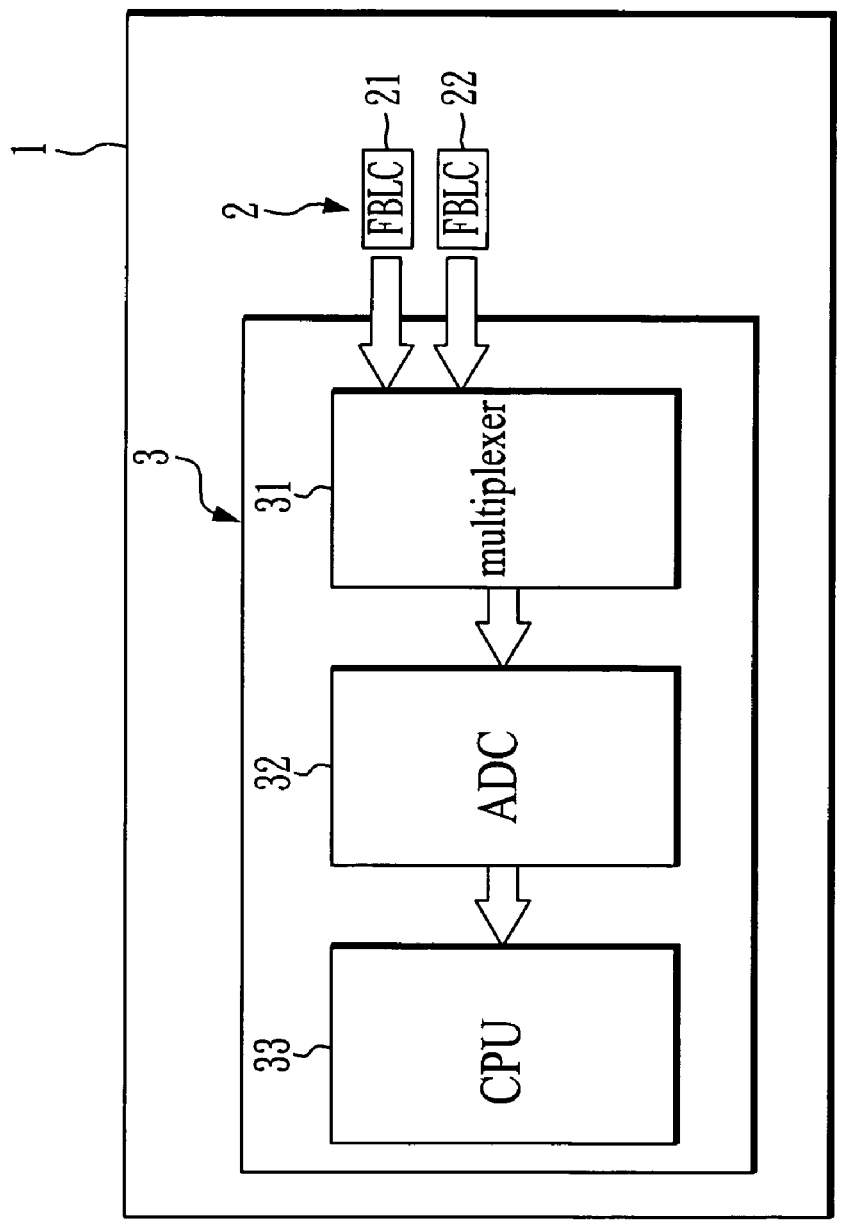
FIG. 2 is a schematic diagram of a system configuration according to an embodiment of the invention.

FIG. 1 is a schematically solid view of a load cell touch control device according to an embodiment of the invention. FIG. 2 is a schematic diagram of a system configuration according to an embodiment of the invention. As shown in FIGS. 1 and 2, the load cell touch control device includes a touch panel 1, a load cell unit 2 and a control unit 3. The touch panel 1 receives a stress applied at a special position thereon. The load cell unit 2 includes a first load cell 21 and a second load cell 22 which are implemented in two laterals of the touch panel 1 to thereby sense or detect the components of the stress applied to the touch panel 1. The control unit 3 includes a multiplexer 31, an analog-to-digital converter (ADC) 32 and a central processing unit (CPU) 33. The multiplexer 31 is connected to the ADC 32, the first load cell 21 and the second load cell 22. The ADC 32 is connected to the CPU 33. The components of the stress detected by the first and second load cells 21, 22 are sent through the multiplexer 31 to the ADC 32 to thereby convert the components into digital signals. The digital signals are sent to the CPU 33 to thereby calculate the magnitude of the stress and the applied position. In this embodiment, the first and second load cells 21, 22 are each a full-bridge load cell, which, as known by a person skilled in the art, is typically implemented on a strain generator in order to sense the strain generated by a stress to accordingly calculate the magnitude of the stress.

As shown in FIG. 1, the first and second load cells 21, 22 can form a line with a length L in the touch panel 1. When a user applies a stress to anywhere on the line, the magnitude and applied position of the stress can be obtained by detecting the components by the first and second load cells 21, 22 and calculating by the control unit 3. Speaking in detail, the user applies a stress F at a point S on the touch panel 1, and in this case the first load cell 21 can detect a component F1 and the second load cell 22 can detect a component F2, for F1+F2=F. Accordingly, the distance between the point S and the first load cell 21 is found as L*F2/F. If the position of the first load cell 21 is set to be the origin, the coordinate of the point S on the line formed of the first and second load cells 21, 22 is L*F2/F.

Figure 3:
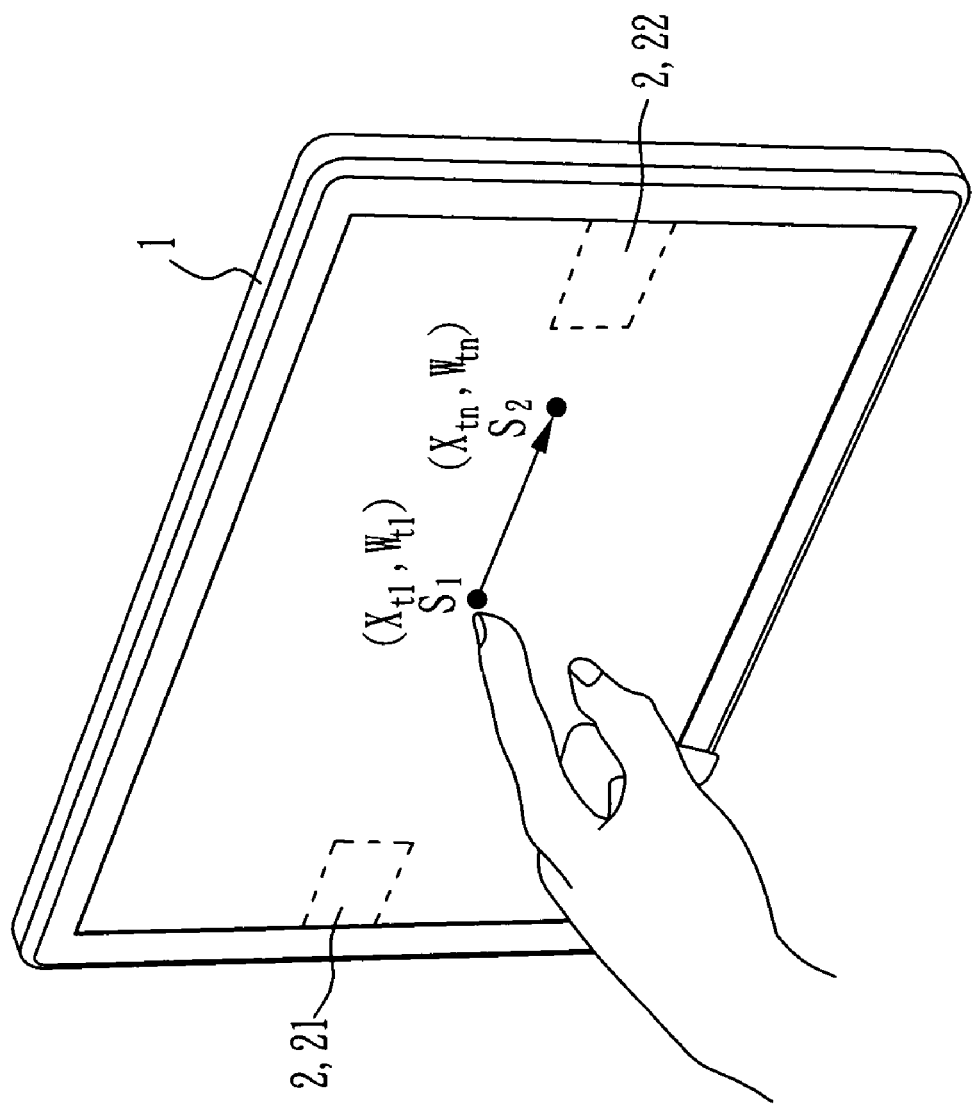
FIG. 3 is a schematic view of a motion trace according to an embodiment of the invention.

If the user applies a motion trace to the touch panel 1, the position and applied strength magnitude for the motion trace can be calculated by plural-time detection. That is, when the user applies a motion trace to the touch panel 1, as shown in FIG. 3, the motion trace has a start S1 and an end S2. The first and second load cells 21, 22 perform n-time detection over a continuous span from the point t1 to the point tn for the motion trace. Each detection for the motion trace is performed as same as the aforementioned procedure for the position and magnitude of the stress F applied at the point S. Accordingly, the position and magnitude of the stress applied at the start S1 is obtained and expressed as (Xt1, Wt1), the middle positions and magnitudes of the stresses applied between the time points t1, tn are obtained and expressed sequentially as (Xt2, Wt2), (Xt3, Wt3), (Xt4, Wt4), . . . , and the final position and magnitude of the stress applied at the end S2 is obtained and expressed as (Xtn, Wtn), for tk indicates an kth detection time point, Xtk indicates an X-axis coordinate position for the stress at tk, Wtk indicates an applied strength magnitude detected at Xtk, and k ranges from 1 to n. Thus, the control unit 3 can obtain the motion direction and applied strength magnitude for the motion trace by combining the detected values, i.e., (Xt1, Wt1) to (Xtn, Wtn).

In addition to the motion direction and applied strength magnitude for the motion trace, the load cells can be applied for the motion speed calculation. The control unit 3 calculates the motion speed applied to the touch panel 1 for the motion trace by an equation as follows:

$$V=(Xt2-Xt1)/(t2-t1),$$

where t1 indicates the first detection time point, t2 indicates the second detection time point, Xt1 indicates an X-axis position for the stress at t1, Xt2 indicates an X-axis position for the stress at t2, and V indicates a motion speed from t1 to t2. Similarly, the following motion speeds over two successive remainders, such as t2 to t3, t3 to t4, . . . , tn−1 to tn, can be calculated.

Figure 4:
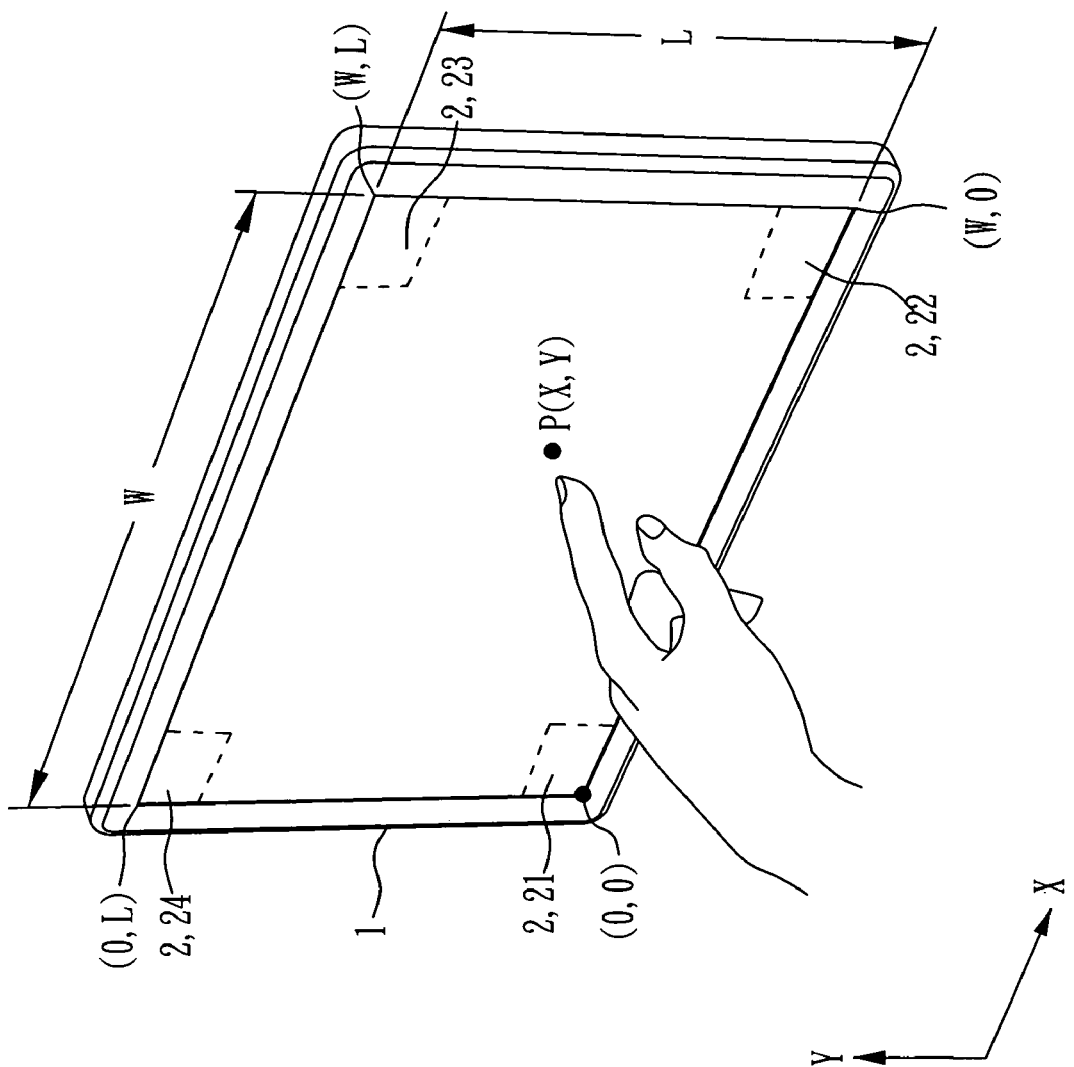
FIG. 4 is a schematically solid view of a load cell touch control device according to another embodiment of the invention.
Figure 5:
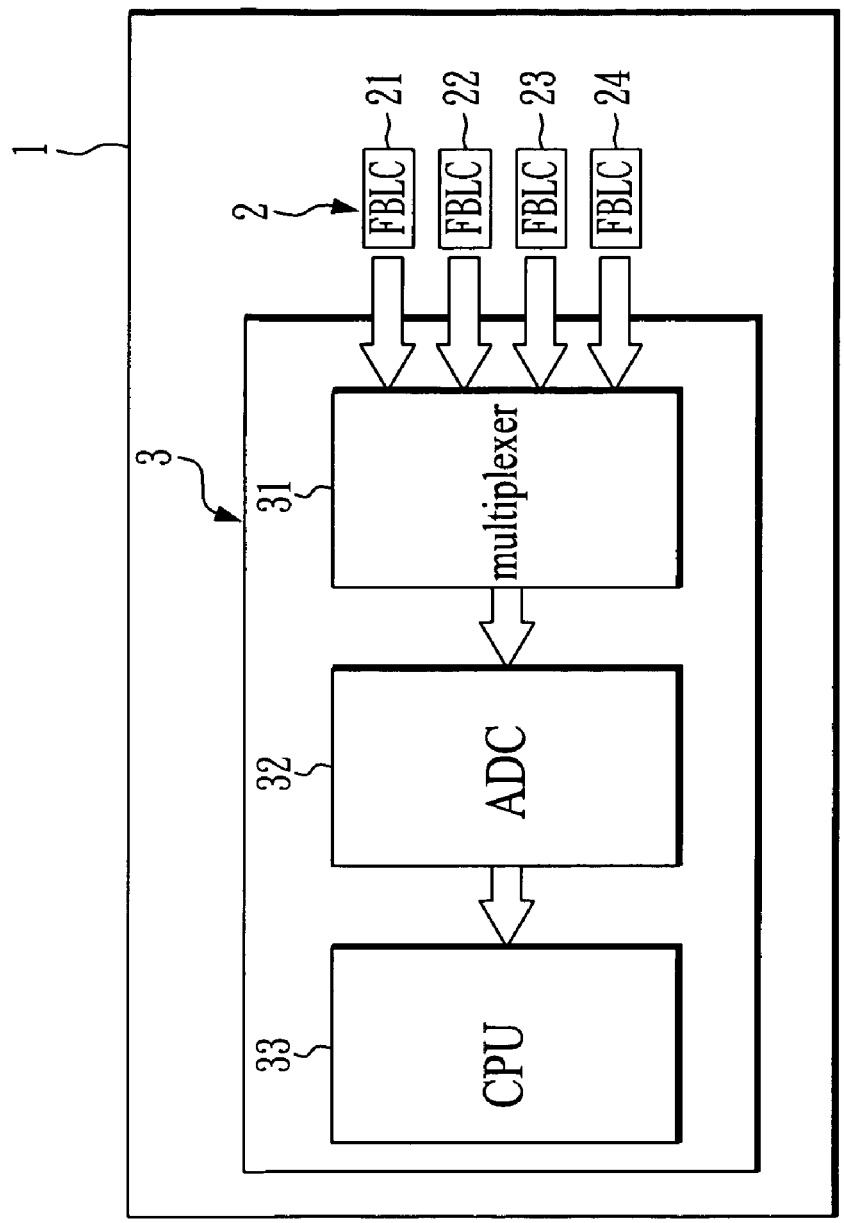
FIG. 5 is a schematic diagram of a system configuration according to another embodiment of the invention.

FIG. 4 is a schematically solid view of a load cell touch control device according to another embodiment of the invention. FIG. 5 is a schematic diagram of a system configuration according to another embodiment of the invention. As shown in FIGS. 4 and 5, the load cell touch control device includes a touch panel 1, a load cell unit 2 and a control unit 3. In this embodiment, the touch panel 1 is identical to that shown in FIGS. 1 and 2, and the load cell unit 2 includes first to fourth load cells 21 to 24 which are each a full-bridge load cell.

The connection between the first load cell 21 and the second load cell 22 has a length W, the connection between the second load cell 22 and the third load cell 23 has a length L, the connection between the third load cell 23 and the fourth load cell 24 has the length W, and the connection between the fourth load cell 24 and the first load cell 21 has the length L. Thus, a rectangle detection plane is formed in the touch panel 1. The control unit 3 includes a multiplexer 31, an analog-to-digital converter (ADC) 32 and a CPU 33. The multiplexer 31 is connected to the ADC 32 and the first to fourth load cells 21 to 24. The ADC 32 is connected to the CPU 33. The components of the stress detected by the first to fourth load cells 21 to 24 are sent through the multiplexer 31 to the ADC 32 to thereby convert the components into digital signals. The digital signals are sent to the CPU 33 to thereby calculate the magnitude of the stress and the applied position.

As shown in FIG. 4, when a user applies a stress F to point P on the touch panel 1, the first load cell 21 detects a component F1, the second load cell 22 detects a component F2, the third load cell 23 detects a component F3, and the fourth load cell 24 detects a component F4, for F1+F2+F3+F4=F. Accordingly, if the position of the first load cell 21 is set to be the origin, the coordinate of the point P is W*(F2+F3)/F in X-axis and L*(F3+F4)/F in Y-axis.

Figure 6:
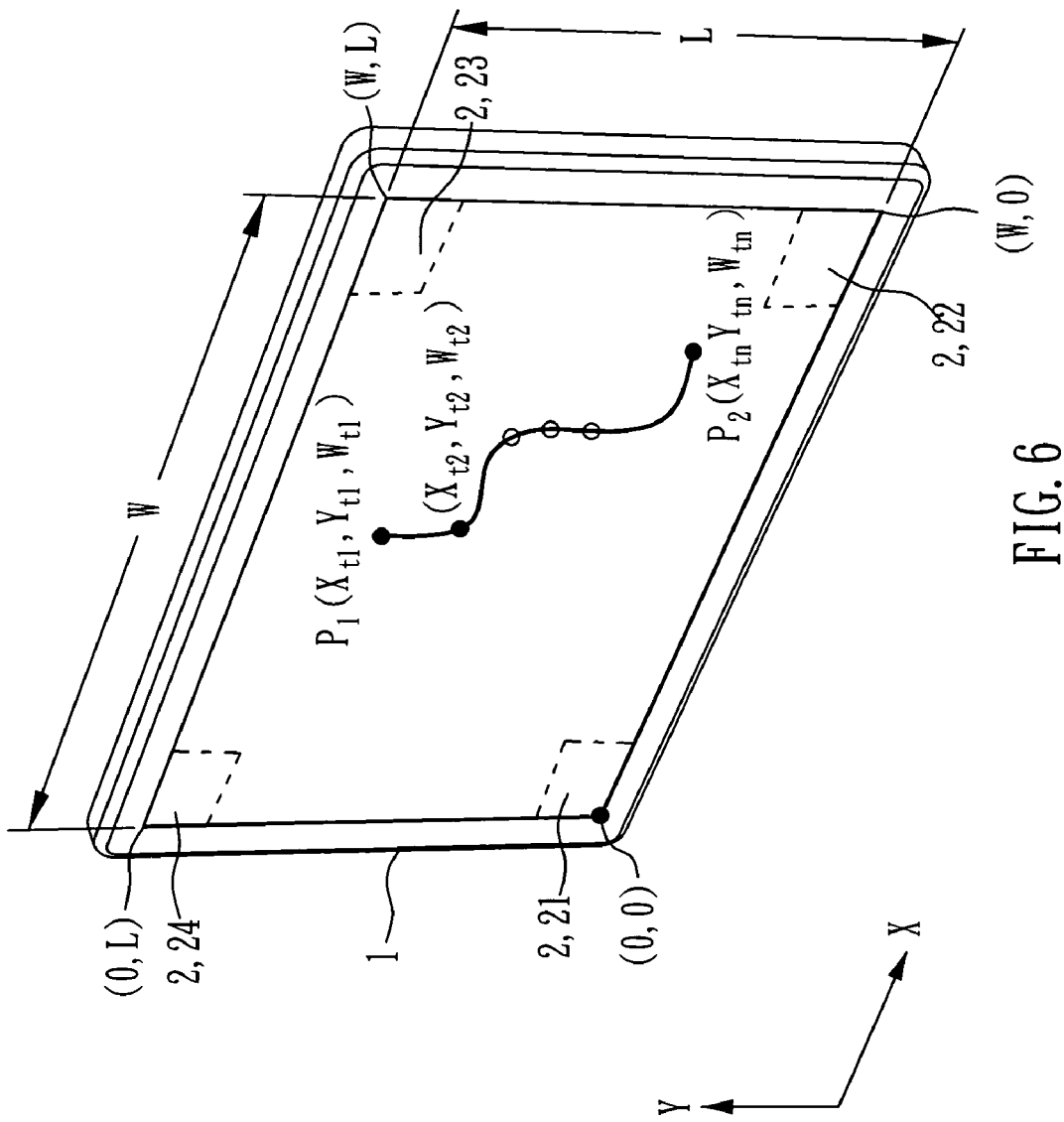
FIG. 6 is a schematic view of a motion trace according to another embodiment of the invention.

If the user applies a motion trace to the touch panel 1, the position and applied strength magnitude for the motion trace can be calculated by plural-time detection. That is, when the user applies a motion trace to the touch panel 1, as shown in FIG. 6, the motion trace has a start P1 and an end P2. The first to fourth load cells 21 to 24 perform n-time detection over a continuous span from the point t1 to the point tn for the motion trace. Each detection for the motion trace is performed as same as the aforementioned procedure for the position and magnitude of the stress F applied at the point P. Accordingly, the position and magnitude of the stress applied at the start P1 is obtained and expressed as (Xt1, Yt1, Wt1), the middle positions and magnitudes of the stresses applied between the time points t1, tn are obtained and expressed sequentially as (Xt2, Yt2, Wt2), (Xt3, Yt3, Wt3), (Xt4, Yt4, Wt4), . . . , and the final position and magnitude of the stress applied at the end P2 is obtained and expressed as (Xtn, Ytn, Wtn), for tk indicates an kth detection time point, Xtk indicates an X-axis coordinate position at tk, Ytk indicates a Y-axis coordinate position at tk, Wtk indicates an applied strength magnitude detected at (Xtk, Ytk), and k ranges from 1 to n. Thus, the control unit 3 can obtain the motion direction and applied strength magnitude for the motion trace by combining the detected values, i.e., (Xt1, Yt1, Wt1) to (Xtn, Ytn, Wtn).

In addition to the motion direction and applied strength magnitude for the motion trace, the load cells can be applied for the motion speed calculation. The control unit 3 calculates the motion speed applied to the touch panel 1 for the motion trace by an equation as follows.

$$V = \frac{\sqrt{(Xt2-Xt1)^2 + (Yt2-Yt1)^2}}{t2-t1},$$

where t1 indicates the first detection time point, t2 indicates the second detection time point, Xt1 indicates an X-axis coordinate position for the stress at t1, Xt2 indicates an X-axis coordinate position for the stress at t2, Yt1 indicates a Y-axis coordinate position for the stress at t1, Yt2 indicates a Y-axis coordinate position for the stress at t2, and V indicates a motion speed from t1 to t2. Similarly, the following motion speeds over two successive remainders, such as t2 to t3, t3 to t4, . . . , tn−1 to tn, can be calculated.

In addition to the used full-bridge load cells, the invention can use a half-bridge load cell to perform a position and strength magnitude detection.

Figure 7:
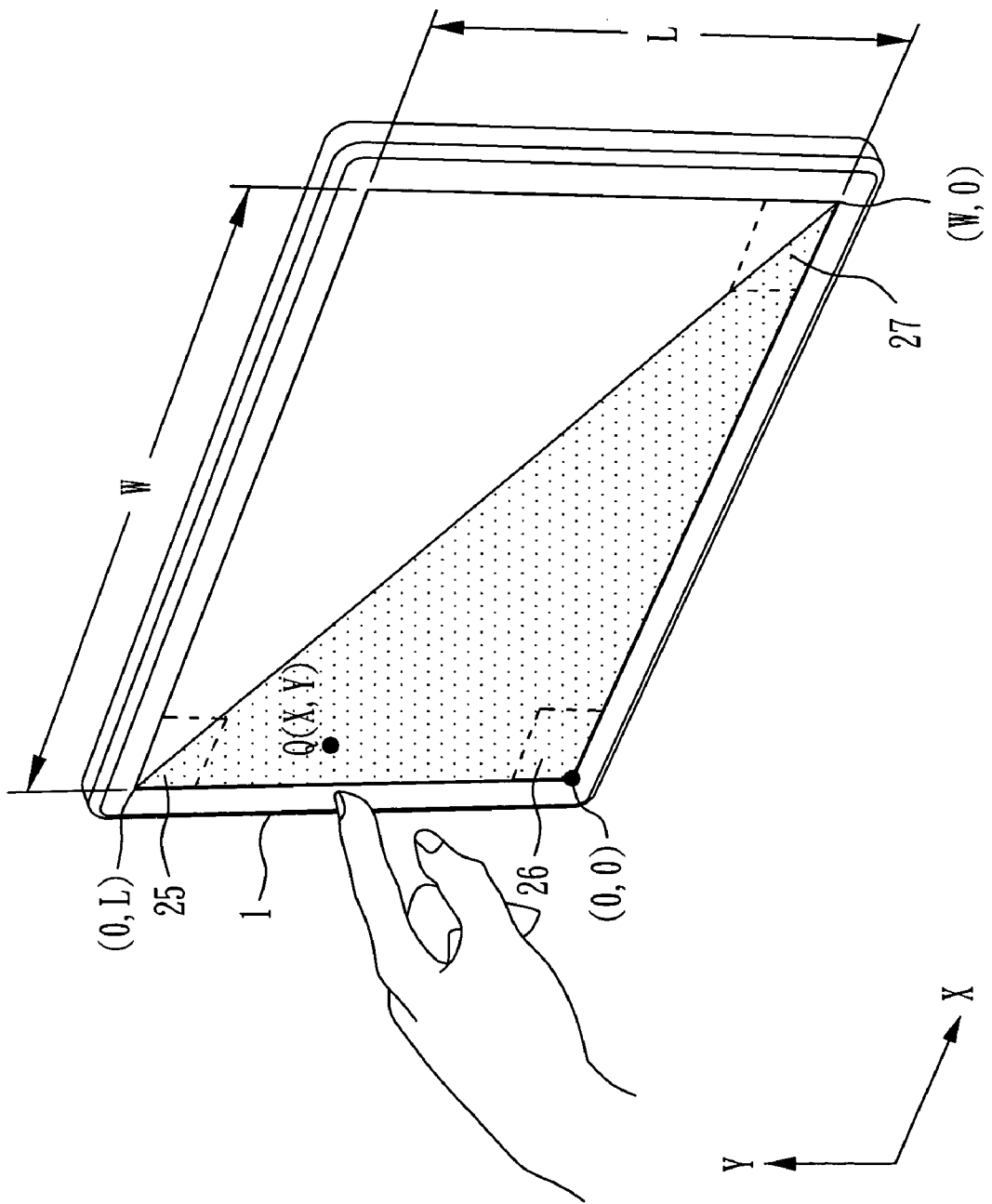
FIG. 7 is a schematically solid view of a load cell touch control device according to a further embodiment of the invention.
Figure 8:
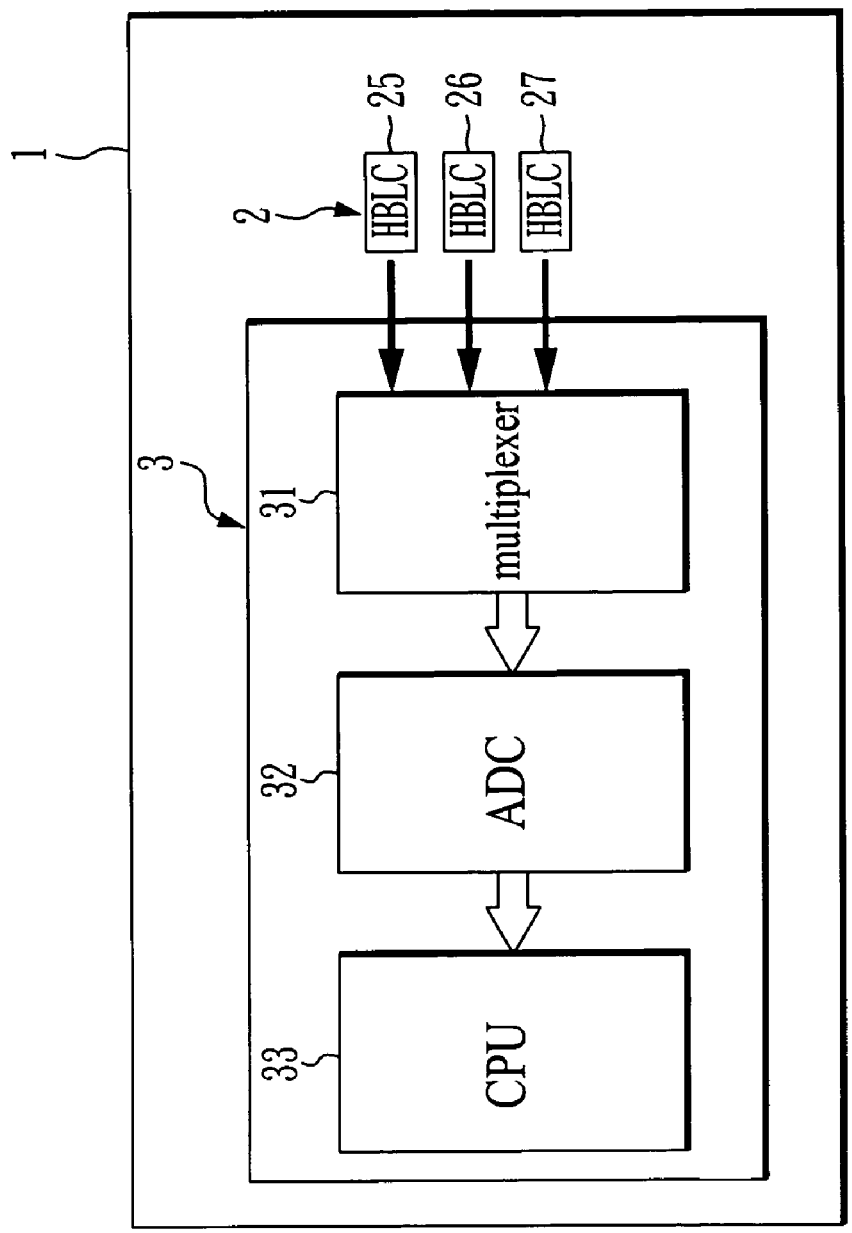
FIG. 8 is a schematic diagram of a system configuration according to a further embodiment of the invention.

FIG. 7 is a schematically solid view of a load cell touch control device according to a further embodiment of the invention. FIG. 8 is a schematic diagram of a system configuration according to a further embodiment of the invention. As shown in FIGS. 7 and 8, the load cell touch control device includes a touch panel 1, a load cell unit 2 and a control unit 3. In this embodiment, the touch panel 1 is identical to that shown in FIGS. 1 and 2, and the load cell unit 2 includes fifth to seventh load cells 25 to 27 which are each a half-bridge load cell. As known by a person skilled in the art, two half-bridge load cells can form a full-bridge load cell to sense the magnitude of a stress.

The connection between the fifth load cell 25 and the sixth load cell 26 has a length L, and the connection between the sixth load cell 26 and the seventh load cell 27 has a length W. Thus, an applied position and strength magnitude detection can be performed in a triangle detection plane formed in the touch panel 1. The control unit 3 includes a multiplexer 31, an analog-to-digital converter (ADC) 32 and a CPU 33. The multiplexer 31 is connected to the ADC 32 and the fifth to seventh load cells 25 to 27. The ADC 32 is connected to the CPU 33. Every two of the fifth to seventh load cells can form a full-bridge load cell through a connection by the multiplexer 31. The components of the stress detected by the pairs, i.e., the fifth and sixth load cells 25, 26, the sixth and seventh load cells 26, 27 and the seventh and fifth load cells 27, 25, are sent through the multiplexer 31 to the ADC 32 to thereby convert the components into digital signals. The digital signals are sent to the CPU 33 to thereby calculate the magnitude of the stress and the applied position. The details of using two half-bridge load cells to form a full-bridge load cell for a strength detection are further described in a co-pending and commonly assigned application Ser. No. 12/216,932, entitled "Multi-dimension detector with half bridge load cells".

As shown in FIG. 7, when a user applies a stress F to point Q on the touch panel 1, the full-bridge load cell formed of the fifth and sixth load cells 25, 26 detects a component F12, the full-bridge load cell formed of the sixth and seventh load cells 26, 27 detects a component F23, and the full-bridge load cell formed of the seventh and fifth load cells 27, 25 detects a component F31, for F12+F23+F31=F. Accordingly, if the position of the sixth load cell 26 is set to be the origin (0, 0), the coordinate of the point Q is W*(1−F12/F) in X-axis and L*(1−F23/F) in Y-axis.

Figure 9:
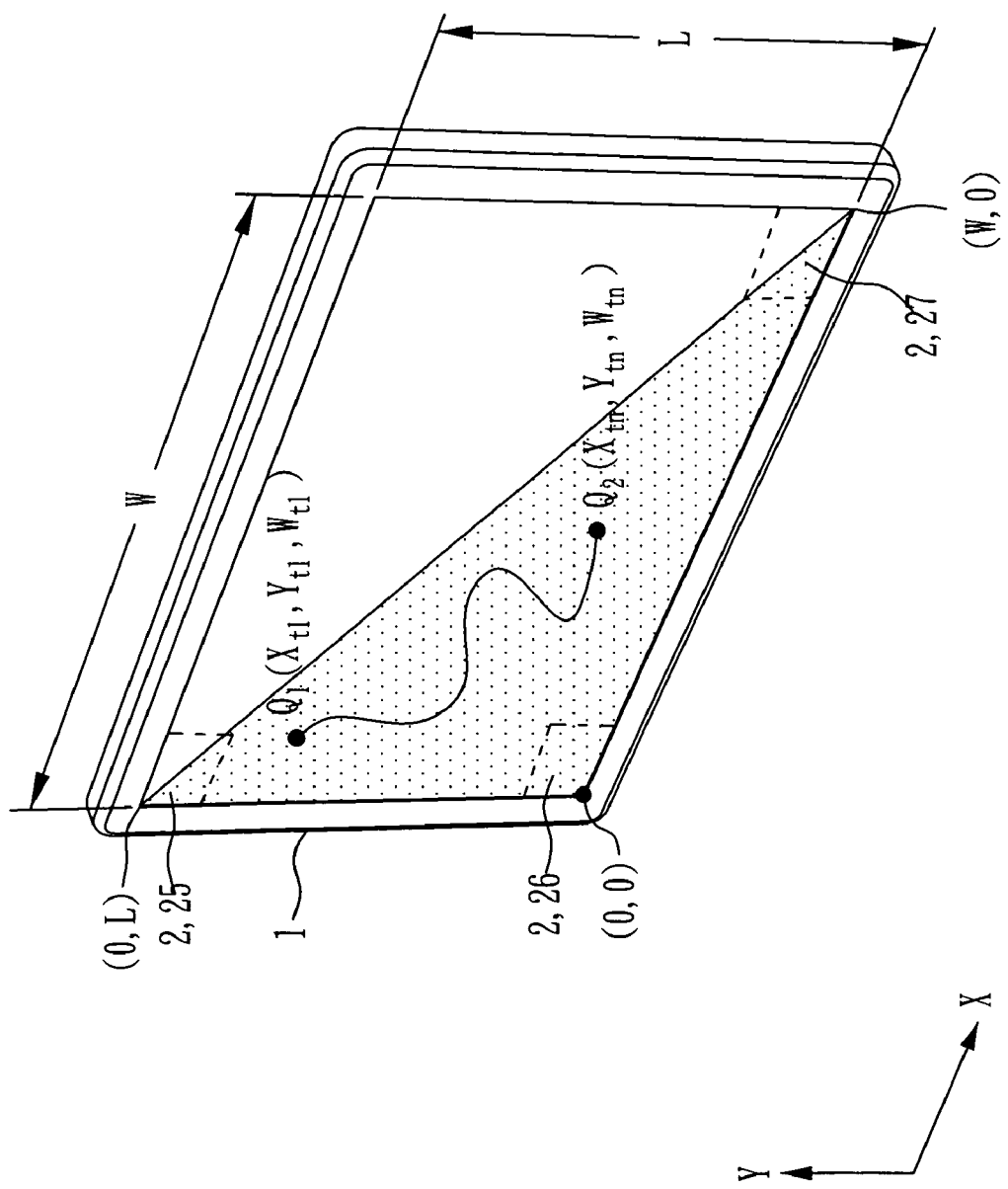
FIG. 9 is a schematic view of a motion trace according to a further embodiment of the invention.

If the user applies a motion trace to the touch panel 1, the position and applied strength magnitude for the motion trace can be calculated by plural-time detection. That is, when the user applies a motion trace to the touch panel 1, as shown in FIG. 9, the motion trace has a start Q1 and an end Q2. The fifth to seventh load cells 25 to 27 perform n-time detection over a continuous span from the point t1 to the point tn for the motion trace. Each detection for the motion trace is performed as same as the aforementioned procedure for the position and magnitude of the stress F applied at the point Q. Accordingly, the position and magnitude of the stress applied at the start Q1 is obtained and expressed as (Xt1, Yt1, Wt1), the middle positions and magnitudes of the stresses applied between the time points t1, tn are obtained and expressed sequentially as (Xt2, Yt2, Wt2), (Xt3, Yt3, Wt3), (Xt4, Yt4, Wt4), . . . , and the final position and magnitude of the stress applied at the end Q2 is obtained and expressed as (Xtn, Ytn, Wtn), for tk indicates an kth detection time point, Xtk indicates an X-axis coordinate position at tk, Ytk indicates a Y-axis coordinate position at tk, Wtk indicates an applied strength magnitude detected at (Xtk, Ytk), and k ranges from 1 to n. Thus, the control unit 3 can obtain the motion direction and applied strength magnitude for the motion trace by combining the detected values, i.e., (Xt1, Yt1, Wt1) to (Xtn, Ytn, Wtn).

In addition to the motion direction and applied strength magnitude for the motion trace, the load cells can be applied for the motion speed calculation. The control unit 3 calculates the motion speed applied to the touch panel 1 for the motion trace by an equation as follows:

$$V = \frac{\sqrt{(Xt2 - Xt1)^2 + (Yt2 - Yt1)^2}}{t2 - t1},$$

where t1 indicates the first detection time point, t2 indicates the second detection time point, Xt1 indicates an X-axis coordinate position for the stress at t1, Xt2 indicates an X-axis coordinate position for the stress at t2, Yt1 indicates a Y-axis coordinate position for the stress at t1, Yt2 indicates a Y-axis coordinate position for the stress at t2, and V indicates a motion speed from t1 to t2. Similarly, the following motion speeds over two successive remainders, such as t2 to t3, t3 to t4, . . . , tn−1 to tn, can be calculated.

Although the present invention has been explained in relation to its preferred embodiment, it is to be understood that many other possible modifications and variations can be made without departing from the spirit and scope of the invention as hereinafter claimed.

What is claimed is:

1. A load cell touch control device, comprising:
a touch panel which receives a stress applied to a special position thereon;
a plurality of load cells which are implemented at predetermined positions in the touch panel to detect respective components of the stress applied to the touch panel; and
a control unit which is connected to the load cells in order to receive magnitudes of the respective components detected by the load cells to thereby calculate the special position and a magnitude of the stress applied to the touch panel based on the respective components and the predetermined positions of the load cells in the touch panel;
wherein the control unit receives the respective components detected by the load cells at a plurality of continuous time points in order to thereby calculate the special position on the touch panel applied at each time point to thereby obtain a motion trace applied to the touch panel, and the control unit comprises a multiplexer connected to the load cells, an analog-to-digital converter connected to the multiplexer, and a central processing unit (CPU) connected to the analog-to-digital converter, and wherein the respective components of the stress detected by the load cells are sent through the multiplexer to the analog-to-digital converter to thereby convert into digital signals which are further sent to the CPU to calculate the magnitude, the special position and a motion speed of the stress.

2. The load cell touch control device as claimed in claim 1, wherein the CPU calculates the motion speed of the stress applied to the touch panel by an equation of:

$$V = \frac{\sqrt{(Xt2 - Xt1)^2 + (Yt2 - Yt1)^2}}{t2 - t1},$$

where V indicates a motion speed, t1 indicates a first detection time point, t2 indicates a second detection time point, Xt1 indicates an X-axis coordinate position for the stress at t1, Xt2 indicates an X-axis coordinate position for the stress at t2, Yt1 indicates a Y-axis coordinate position for the stress at t1, and Yt2 indicates a Y-axis coordinate position for the stress at t2.

3. The load cell touch control device as claimed in claim 1, wherein the load cells comprises a first load cell and a second load cell which form a line.

4. The load cell touch control device as claimed in claim 3, wherein the first and the second load cells are each a full-bridge load cell.

5. The load cell touch control device as claimed in claim 4, wherein the CPU calculates the special position of the stress applied to the touch panel by an equation of:

$$F=F1+F2,$$

$$S=L*F2/F,$$

where F indicates the magnitude of the stress applied to the touch panel, F1 indicates a component magnitude detected by the first load cell, F2 indicates a component magnitude detected by the second load cell, L indicates a length of the line formed of the first and second load cells, and S indicates a distance from the special position to the first load cell.

6. The load cell touch control device as claimed in claim 3, wherein the CPU calculates a position and an applied strength magnitude by plural-time detection for obtaining the motion trace applied to the touch panel.

7. The load cell touch control device as claimed in claim 1, wherein the load cells comprises first to third load cells which form a plane.

8. The load cell touch control device as claimed in claim 7, wherein the first to third load cells are each a half-bridge load cell.

9. The load cell touch control device as claimed in claim 8, wherein the CPU calculates the special position of the stress applied to the touch panel by an equation of:

$$F=(F12+F23+F31)/2,$$

$$X=W*(1-F12/F)$$

$$Y=L*(1-F23/F),$$

where F indicates the magnitude of the stress applied to the touch panel, F12 indicates a component magnitude detected by the first and second load cells, F23 indicates a component magnitude detected by the second and third load cells, F31 indicates a component magnitude detected by the third and first load cells, W indicates a length of a line formed of the first and second load cells, L indicates a length of a line formed of the second and third load cells, X indicates a distance from the special position to the line formed of the first and second load cells, and Y indicates a distance from the special position to the line formed of the second and third load cells.

10. The load cell touch control device as claimed in claim 7, wherein the CPU calculates a position and an applied strength magnitude by plural-time detection for obtaining the motion trace applied to the touch panel.

11. The load cell touch control device as claimed in claim 1, wherein the load cells comprises first to fourth load cells which form a plane.

12. The load cell touch control device as claimed in claim 11, wherein the first to fourth load cells are each a full-bridge load cell.

13. The load cell touch control device as claimed in claim 12, wherein the CPU calculates the special position of the stress applied to the touch panel by an equation of:

$$F=F1+F2+F3+F4,$$

$$X=W*(F2+F3)/F,$$

$$Y=L*(F3+F4)/F,$$

where F indicates the magnitude of the stress applied to the touch panel, F1 indicates a component magnitude detected by the first load cell, F2 indicates a component magnitude detected by the second load cell, F3 indicates a component magnitude detected by the third load cell, F4 indicates a component magnitude detected by the fourth load cell, W indicates a length of a line formed of the first and second load cells, L indicates a length of a line formed of the second and third load cells, X indicates a distance from the special position to the line formed of the first and second load cells, and Y indicates a distance from the special position to the line formed of the second and third load cells.

14. The load cell touch control device as claimed in claim 11, wherein the CPU calculates a position and an applied strength magnitude by plural-time detection for obtaining the motion trace applied to the touch panel.

* * * * *